B. R. DRAUDT.
SEAL PADLOCK.
APPLICATION FILED NOV. 13, 1909.
964,094.
Patented July 12, 1910.
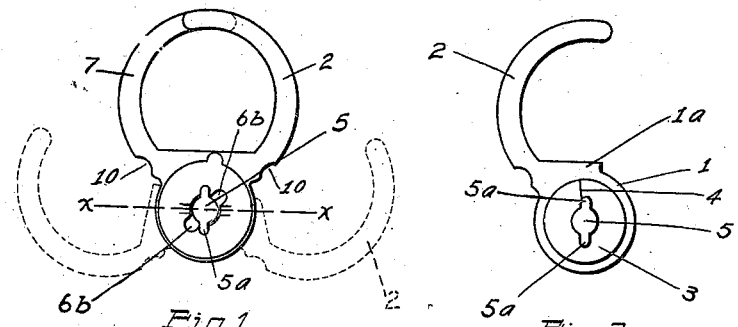
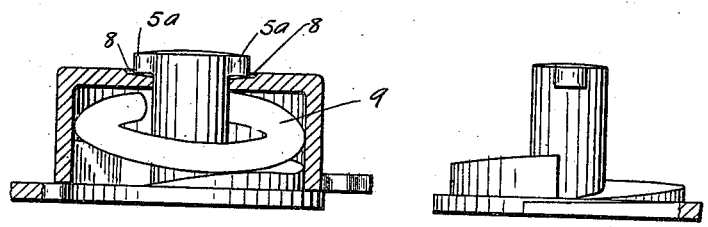
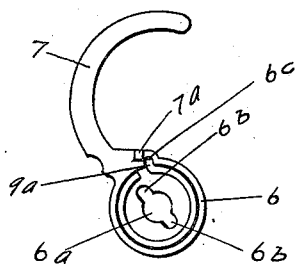
Witnesses
E. Maurer
A. L. Phelps
Inventor
Benjamin R. Draudt
By C. C. Shepherd
Attorney

UNITED STATES PATENT OFFICE.

BENJAMIN R. DRAUDT, OF CLEVELAND, OHIO, ASSIGNOR TO THE CORBETT-STEVENS COMPANY, OF COLUMBUS, OHIO, A CORPORATION OF OHIO.

SEAL-PADLOCK.

964,094.  Specification of Letters Patent.  Patented July 12, 1910.

Application filed November 13, 1909. Serial No. 527,848.

*To all whom it may concern:*

Be it known that I, BENJAMIN R. DRAUDT, a citizen of the United States, residing at Cleveland, in the county of Cuyahoga and State of Ohio, have invented certain new and useful Improvements in Seal-Padlocks, of which the following is a specification.

My invention relates to the improvement of seals of that class which are adapted for use in sealing car doors, gas and water pipe connections and closures of various kinds.

The objects of my invention are to provide a simple and inexpensive seal of this class which may be readily applied and which when moved to the locked position cannot be opened without being broken. These objects I accomplish in the manner illustrated in the accompanying drawing, in which—

Figure 1 is a front view of my improved seal, showing in full lines the positions of the parts when the same is closed or locked and showing in dotted lines the fingers in the open position, Fig. 2 is an inner side view of one of the sections of my improved seal, Fig. 3 is an exaggerated sectional view on line $x$—$x$ of Fig. 1, Fig. 4 is an enlarged side elevation of what we will term the inner or rear seal section, and, Fig. 5 is an inner face view of the outer seal section, showing the locking spring in place therein.

Similar numerals refer to similar parts throughout the several views.

In carrying out my invention, I employ two main or principal seal sections, the inner or rear one of which comprises a disk-like body 1, from the periphery of which extends outward and inward a curved locking finger 2. At the junction of the base of this finger and the disk-like body 1, said disk is formed with a shoulder or enlargement as indicated at 1ª. The face of the body 1 is formed with a circular projection or round boss 3, the upper surface of which is formed with a coil or screw thread incline which extends to a point opposite the enlargement 1ª to its point of beginning, the gradual increase in thickness of the boss resulting in the formation of a vertical shoulder 4 at the junction of its high and low end. From the center of the boss or projection 3, extends outwardly a key-stem or stud 5, the outer end of which is formed on opposite sides with opposing lugs 5ª. In the construction of the remaining section of my device, I form a circular cup body 6 of a size which is adapted to receive and embrace the shallow boss 3 of the first described section. In the formation of this cup body, I produce in its outer face an elongated opening 6ª, which is in the nature of a substantially round hole having opposing recesses or extensions 6ᵇ, the opening thus formed being substantially the shape of, although slightly larger, than the head or outer end of the key stem 5. The cup body 6 has extending therefrom an outwardly and inwardly curved finger 7 at the base of which is formed an inwardly projecting stop lug 7ª. Adjacent to this stop lug, I provide the inner wall of the cup body with a lateral recess or offset 6ᶜ. It will be observed that the opposing lug extensions 5ª of the head of the key stem 5, extend in the general direction of the length of the section and on a line which would intersect the outer end portion of the finger 2, while the recess extensions 6ᵇ of the opening 6ª of the cup body 6, extend on a line at an angle with the direction of the length of the seal section. In forming the cup body 6, I produce in the outer face thereof on opposite sides of the opening 6, slight depressions 8, these depressions being formed respectively near the opening extensions 6ᵇ.

9 represents a spring, which comprises a spring wire bent to form the greater portion of one coil of a coiled spring. One end of the spring thus formed is turned outward as indicated at 9ª. As shown in the drawing, the spring formed as above described, lies within the cup body 6 and bears against the inclined surface of the boss 3 of the body 1 when said boss is inserted into said cup member. When in this position, it will be understood that the projecting end portion 9ª of the spring, extends into the recess 6ᶜ of the cup body.

In uniting the sections of the seal, the head of the key stem 5 passes through the correspondingly shaped opening 6 of the cup body and when this insertion is first accomplished, the fingers 2 and 7 are opened or separated to the greatest extent. It is obvious, however, that by imparting a partial turn to the cup body, the projecting members 5ª of the stem 5 will travel about the marginal portion of the opening 6ª until said projecting members 5ª drop into the external recesses 8 of the cup member, in which position they may be temporarily or movably held by the pressure of the spring against the inclined face of the boss 3. This partial rotation of the cup body also results in the two fingers 2 and 7 being closed partially toward each other and it is in this partially closed position that it is designed to retain the seal until it is ready for complete closing or locking. To complete the operation of closing the seal fingers through a staple, eye piece or other member, the closing rotation of the cup body is continued until the free end of the spring 9 drops downward into engagement with the shoulder 4 of the boss 3, thus locking the seal members against movement to the open position. The fingers 7 and 2 are of such length and curvature, as to insure the ends thereof overlapping when the same are closed, thus converting said fingers into a substantially ring or loop-shaped body which can only be separated by the breaking of the seal.

In order to facilitate the ready breaking of the seal when desired, I have preferably provided the outer side of the base or inner portion of each of the seal fingers with an indentation or recess such as is indicated at 10.

From the operation described, it will be understood that the engagement of the shoulder 4 and the end of the spring will operate to prevent a reverse rotation of the cup body 6 or disk 1 and that the contact of the lug 7ª of one seal section and the shoulder 1ª of the other seal section, will prevent a continued rotation of the parts past the locking position.

It will be observed that my improved seal is simple of construction and that it may be produced at a comparatively slight cost.

From the foregoing description, it will be seen that simple and efficient means are herein provided for accomplishing the objects of the invention, but while the elements shown and described are well adapted to serve the purposes for which they are intended, it is to be understood that the invention it not limited to the precise construction set forth, but includes within its purview such changes as may be made within the scope of the appended claims.

What I claim, is:—

1. In a seal, the combination with a cup-like body having a locking finger extending therefrom and an elongated opening in the closed face of said body, and a spring within said cup body, said spring forming a partial coil and having one of its ends held against movement, of a member comprising a body portion formed with a circular boss having an inclined upper surface terminating in a shoulder, said body portion having formed therewith an outwardly extending locking finger, and a central stud having an elongated head adapted to enter the correspondingly shaped opening of said cup body.

2. In a seal, the combination with a seal section comprising a body portion having an elongated opening in its face and a locking finger projecting from said body portion, of a second seal section comprising a body portion one face of which has formed thereon a projecting stem provided with a head of corresponding shape with the opening of said first mentioned section, the face of said body about said stem base being gradually inclined upwardly as described to form a terminal shoulder, a locking finger projecting from the body member of said second seal section, and a spring in the form of a partial coil interposed between said seal section and extending about said stem, one end of said spring being held against movement by engagement with one of said sections and the other end being free to engage the terminal shoulder of the face incline of the second section.

In testimony whereof I affix my signature in presence of two witnesses.

BENJAMIN R. DRAUDT.

Witnesses:
NELL H. HOLDEN,
A. M. DE MAYER.